(12) United States Patent
Endtbacka

(10) Patent No.: US 9,238,285 B2
(45) Date of Patent: Jan. 19, 2016

(54) CERAMIC CUTTING INSERT AND METHOD OF MAKING SAME

(75) Inventor: Thomas Endtbacka, Älta (SE)

(73) Assignee: Sandvik Intellectual Property AB, Sandviken (SE)

( * ) Notice: Subject to any disclaimer, the term of this patent is extended or adjusted under 35 U.S.C. 154(b) by 1234 days.

(21) Appl. No.: 12/073,853

(22) Filed: Mar. 11, 2008

(65) Prior Publication Data

US 2008/0227620 A1 Sep. 18, 2008

(30) Foreign Application Priority Data

Mar. 12, 2007 (SE) ...................................... 0700624

(51) Int. Cl.
| | |
|---|---|
| B23B 27/14 | (2006.01) |
| B24B 31/06 | (2006.01) |
| B23P 15/28 | (2006.01) |
| C04B 41/00 | (2006.01) |
| C04B 41/53 | (2006.01) |
| C04B 41/91 | (2006.01) |

(52) U.S. Cl.
CPC ............... *B23P 15/28* (2013.01); *B23B 27/141* (2013.01); *C04B 41/009* (2013.01); *C04B 41/53* (2013.01); *C04B 41/91* (2013.01); *B23B 2200/245* (2013.01); *B23B 2200/3609* (2013.01); *B23B 2226/18* (2013.01); *B23B 2228/61* (2013.01)

(58) Field of Classification Search
CPC ........ B23B 27/14; B23B 27/16; B24B 31/02; B24B 31/06
USPC ............ 451/540, 32, 33, 34, 35; 51/293, 307, 51/309; 264/683
See application file for complete search history.

(56) References Cited

U.S. PATENT DOCUMENTS

| | | | |
|---|---|---|---|
| 3,152,385 A | * | 10/1964 | Wheildon, Jr. et al. ....... 407/119 |
| 4,869,329 A | | 9/1989 | Kar et al. |
| 5,451,469 A | | 9/1995 | Gustafson et al. |
| 5,549,980 A | | 8/1996 | Ostlund et al. |
| 5,771,763 A | * | 6/1998 | Naslund et al. ................. 82/1.11 |

FOREIGN PATENT DOCUMENTS

| | | |
|---|---|---|
| EP | 0 654 317 | 5/1995 |
| JP | 2006192552 A | 7/2006 |

* cited by examiner

*Primary Examiner* — Robert Rose
(74) *Attorney, Agent, or Firm* — Morgan, Lewis & Bockius LLP

(57) ABSTRACT

The present invention relates to a method of manufacturing a ceramic cutting insert, based on an oxide ceramic or a nitride ceramic or a mixed ceramic material, possibly containing whiskers, in a process comprising the powder metallurgical steps of providing a ready-to-press ceramic powder, pressing the ready-to-press powder into a compact of desired shape, sintering the compact to dense a ceramic blank followed by tumbling the ceramic blank, to remove sinter skin and provide an edge rounding.

17 Claims, 3 Drawing Sheets

CERAMIC CUTTING INSERT AND METHOD OF MAKING SAME

BACKGROUND OF THE INVENTION

The present invention relates to a method of making a ceramic cutting insert for metal machining and a ceramic cutting insert.

Ceramic cutting inserts are produced by powder metallurgical methods comprising milling, pressing and sintering. From the sintering process ceramic insert blanks are obtained. As a result of the pressing operation, the blanks have rather sharp cutting edges and also sinter skin as a result of the sintering process. However, sharp edges break too easily when used and sinter skin may contain surface defects acting as crack initiation points for an insert in operation. The sintered blanks must therefore be subjected to post-sintering treatment. Normally, there is also a need to perform a post-sintering treatment in order to obtain cutting inserts having the correct final shape and dimensional tolerances.

Ceramic insert materials for metal machining are of the hard but brittle type, thus easily obtaining surface defects, such as chipping, if surface treated in an inappropriate way. For this reason, care must be taken during the post-sintering treatment not to cause damage to the insert blank surface and particularly to the sharp, as-sintered, cutting edge. In some circumstances, such as when surface treating particular ceramic material grades, special measures must be taken in order not to cause unacceptable surface defects and hence rejection of the finished insert.

The common way of shaping ceramic insert blanks and removing the sinter skin is by using abrasive rubbing tools, such as conventional grinding wheels. However, grinding of ceramic blanks, in order to obtain the desired final shape, is known to be an expensive procedure requiring precision grinding equipment as well as extensive manual handling of the blanks or, alternatively, the use of expensive equipment for automated handling. In order to obtain an edge rounding of the cutting edge it is also necessary to perform a second post-sintering step, normally in the form of a brushing operation.

The resulting edge rounding can be described by a W/H ratio, where W is the width of the edge rounding along a rake face and H is the width of the edge rounding along a clearance face. In order to obtain the expected service life of the cutting insert, the W/H ratio achieved by the treatment must be within a certain tolerance.

The tumbling process has been used for many years for surface preparation and treatment of metal and metal alloy articles, for example for achieving deburring, radiusing or polishing of components for gas turbine engines, such as blades, vanes and nozzles.

U.S. Pat. No. 4,869,329 discloses a method of treating inserts for rock bits for drilling comprising a composite material of, e.g., tungsten carbide bonded with Co or a Ni—Fe composition, using extended vibratory tumbling in order to increase their fracture toughness.

OBJECTS AND SUMMARY OF THE INVENTION

It is an object of the present invention to provide a method of manufacturing ceramic cutting inserts alleviating the problems of the prior art.

It is further an object of the present invention to provide an efficient method for post-sintering treatment of ceramic cutting inserts blanks.

In one embodiment of the invention, there is provided a method of manufacturing a ceramic cutting insert, based on an oxide ceramic, a nitride ceramic or a mixed ceramic material in a process comprising the powder metallurgical steps of providing a ready-to-press ceramic powder, pressing the ready-to-press powder into a compact of desired shape, sintering the compact to a dense ceramic blank and tumbling the ceramic blank to remove sinter skin and provide an edge rounding.

In another embodiment of the invention, there is provided a cutting insert made by the above process having an edge rounding with a W value of from about 30 to about 70 μm, an H value of from about 30 to about 70 μm and a W/H ratio of from about 0.8 to about 1.6, and a smooth surface having an $MR_a$ value of equal to or less than about 0.30 μm.

DETAILED DESCRIPTION OF THE PREFERRED EMBODIMENTS

Figure 1:
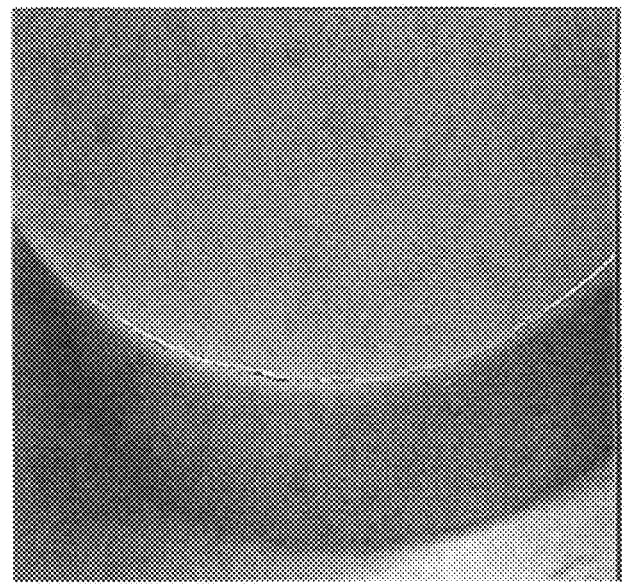
FIG. 1 shows a light optical image of an edge of an exemplary ceramic cutting insert subjected to a post-sintering treatment according to the invention.

It has surprisingly been found that it is possible in a single post-sintering operation of a ceramic insert blank to achieve a surface treatment, removing sinter skin, as well as achieving an edge rounding to a W, H and W/H ratio within the required tolerance.

According to the present invention, there is provided a method of manufacturing a ceramic cutting insert, based on an oxide ceramic or a nitride ceramic or a mixed ceramic material, possibly containing whiskers (e.g., of SiC), in a process comprising the powder metallurgical steps of providing a ready-to-press ceramic powder, pressing the ready-to-press powder into a compact of desired shape, sintering the compact to a dense ceramic blank and tumbling the ceramic blank, to remove sinter skin and provide an edge rounding.

More specifically, the method is characterized by running the tumbling process step until the ceramic insert has an edge rounding of the cutting edge with a W value of from about 30 to about 70 μm, an H value of from about 30 to about 70 μm and a W/H ratio of from about 0.8 to about 1.6, as well as a mean surface roughness value, $MR_a$ value, of equal to or less than about 0.30 μm, preferably equal to or less than about 0.25 μm.

It is within the purview of the skilled artisan to determine the tumbling time necessary to obtain the desired edge rounding, with the specified values for W, H and the W/H ratio, and the desired $MR_a$ value.

The invention is particularly successful when applying the method on a cutting insert having a rounded shape.

It has further been determined that the invention works particularly well when applying the method on a cutting insert of a sialon grade.

It is preferred to use ceramic chips, preferably aluminum oxide chips, as tumbling media.

In one embodiment, the tumbling time is equal to or more than about 300 minutes, more preferably equal to or more than about 360 minutes, but preferably equal to or less than about 720 minutes, more preferably equal to or less than about 660 minutes.

In one preferred embodiment, the tumbling process is performed in a vibratory tumbler.

In one embodiment the tumbling process comprises loading the sintered ceramic blanks into a tumbler, of vibratory type, with ceramic chips as tumbling media, where the weight ratio of chips:blanks is from about 3:1 to about 7:1, the total blank weight being from about 5 to about 13 kg, adding a conventional grinding support compound in an amount of from about 1400 to about 1800 g, running water at speed of about 1 liter/hour, and running the tumbling process for from about 570 to about 630 minutes.

In one embodiment the tumbled insert is further subjected to a grinding operation on selected surfaces, e.g., the top and bottom surface of an insert having rounded shape, followed by a second tumbling step to provide a smooth surface and/or an edge rounding.

According to the invention, there is also provided a ceramic cutting insert, based on an oxide ceramic or a nitride ceramic or a mixed ceramic material, possibly containing whiskers, manufactured by the above method wherein the finished insert has an edge rounding of the cutting with a W value of from about 30 to about 70 μm, an H value of from about 30 to about 70 μm and a W/H ratio of from about 0.8 to about 1.6, and a smooth surface having an $MR_a$ value of equal to or less than about 0.30 μm, preferably equal to or less than about 0.25 μm.

In a preferred embodiment, said cutting insert has a rounded shape.

In another preferred embodiment, the cutting insert is of a sialon grade.

The invention is additionally illustrated in connection with the following examples, which are to be considered as illustrative of the present invention. It should be understood, however, that the invention is not limited to the specific details of the examples.

EXAMPLE 1

Ceramic cutting inserts of the type RNGN 1207000, having a rounded shape, were manufactured by preparing a raw material powder mixture of 68.62 wt-% $Si_3N_4$, 9.28 wt-% $Al_2O_3$, 17.11 wt-% 21 R—F, and 4.99 wt-% $Y_2O_3$ were milled in water, using sialon milling media. Organic binders were mixed into the slurry, which was then granulated through spray drying. The powders were cold-pressed uniaxially to form green bodies, which were then burnt off separately at 650° C. The burnt off green bodies were then sintered under nitrogen pressure at a maximum sintering temperature of 1810° C. The sintered blanks were loaded into a 200 liter vibratory tumbler with cylindrical ceramic chips (3×6 mm) of highly abrasive efficiency sort in 5:1 weight ratio chips: blanks. The total blank weight was 10 kg. A compound was added, totally 2000 gram, and running water at rate of 1 liter/hour. The out-of-balance settings of the vibratory tumbler were 4/40/110° and the motor ran at 1700 rpm, resulting in an amplitude of 2.5 mm. With these settings two sets of inserts, Sample A and Sample B, were produced, being run in the tumbler for 360 and 540 min, respectively.

Measurements of the surfaces condition of Sample A (FIG. 1) showed that the insert had a W value of 67 μm, a H value of 65 μm, the W/H ratio of the edge rounding thus being 1.03. Further measurements showed that the surface zone had been removed to an approximate depth of 8 μm, leaving a smooth surface having an $MR_a$ value of 0.253 μm, as measured by stylus technique (Mitutoyo Surftest 211), indicating that surface irregularities had been removed. The measurements also showed that the circular shape of the insert had not been changed in the tumbling process. A slight tendency to chipping of the cutting edge was observed.

Figure 2:
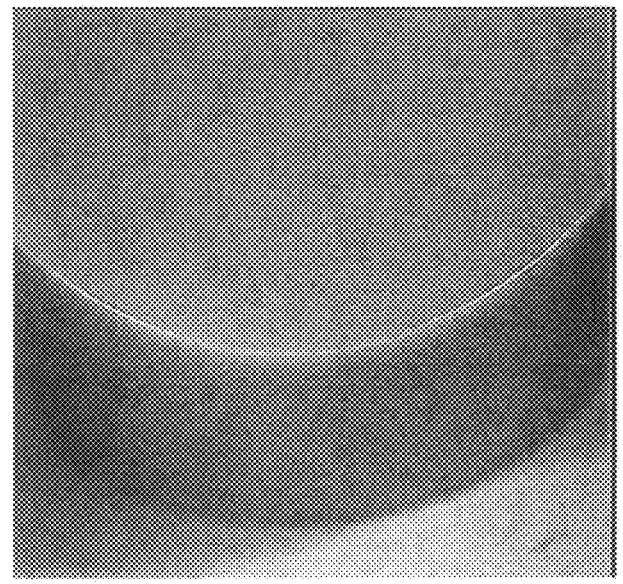
FIG. 2 shows a light optical image of an edge of an exemplary ceramic cutting insert subjected to a post-sintering treatment according to the invention.

Measurements of the surfaces condition of Sample B (FIG. 2) showed that the insert had a W value of 51 μm, a H value of 62 μm, the W/H ratio of the edge rounding thus being 0.82. Further measurements showed that the surface zone had been removed to an approximate depth of 10 μm of leaving a smooth surface having an $MR_a$ value of 0.223 μm, indicating that surface irregularities had been removed. The measurements also showed that the circular shape of the insert had not been changed in the tumbling process. No tendency to chipping of the cutting edge was observed.

EXAMPLE 2

Figure 3:
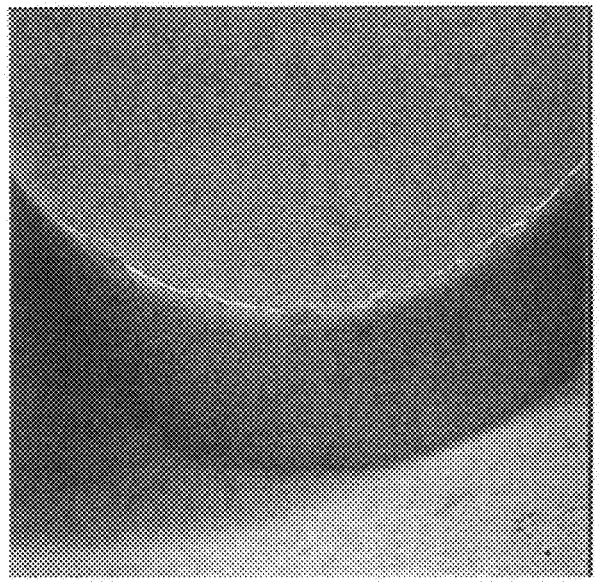
FIG. 3 shows a light optical image of an edge of an exemplary ceramic cutting insert subjected to a comparative post-sintering treatment.
Figure 4:
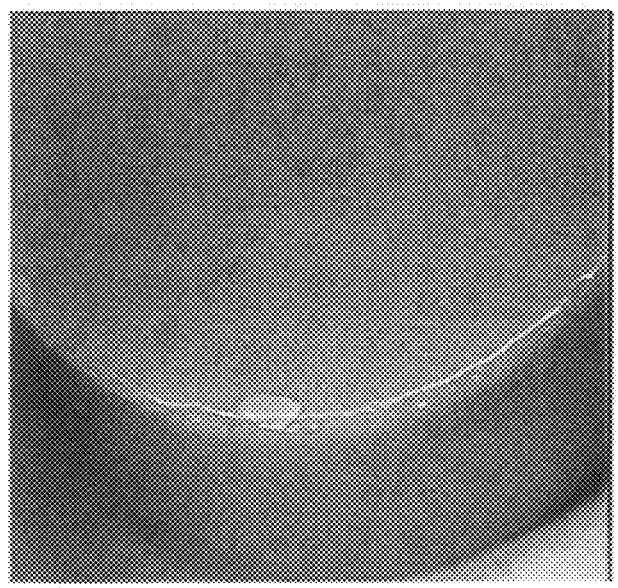
FIG. 4 shows a light optical image of an edge of an exemplary ceramic cutting insert subjected to a comparative post-sintering treatment.

Ceramic cutting inserts of the same grade and type as in Example 1 were prepared, but were instead subjected to a post-sintering treatment according to the following. The sintered blanks were loaded into a 25 liter tumbler of centrifugal disc finishing type with triangular ceramic chips (6×6 mm) of a sort having less abrasive efficiency than in Example 1 in 5:1 weight ratio chips:blanks. The total chip weight was 28 kg. A compound cleansing agent, 2 vol-% in an aqueous solution, was added and running the solution at rate of 30 liter/hour. With these settings two sets of inserts were produced, Sample C (FIG. 3) and Sample D (FIG. 4), being run in the tumbler for 30 and 60 min, respectively.

Measurements of the surfaces condition of Sample C (FIG. 3) showed that the insert had a W value of 30 μm, an H value of 179 μm, the W/H ratio of the edge rounding thus being 0.16. Further measurements showed that the surface zone had been removed to an approximate depth of 14 μm leaving a surface having an $MR_a$ value of 0.561 μm, as measured by stylus technique. The measurements also showed that the circular shape of the insert had not been changed in the tumbling process. The cutting edge had obtained excessive chipping.

Measurements of the surfaces condition of Sample D (FIG. 4) showed that the insert had a W value of 38 μm, an H value of 200 μm, the W/H ratio of the edge rounding thus being 0.19. Further measurements showed that the surface zone had been removed to an approximate depth of 21 μm, leaving a smooth surface having an $MR_a$ value of 0.503 μm. The measurements also showed that the circular shape of the insert had not been changed in the tumbling process. The cutting edge had obtained excessive chipping.

EXAMPLE 3

Inserts from Example 1, Sample B, were tested and compared with a reference ceramic insert of the same grade and style, but being ground to final shape after sintering, in a turning operation.

Material: Waspaloy
Cutting data:

| Cutting speed = | 230 m/min |
|---|---|
| Feed = | 0.28 mm/rev |
| Depth of cut = | 2 mm |
| Time in cut = | 2 minutes |

5 edges of each variant were tested

Figure 5:
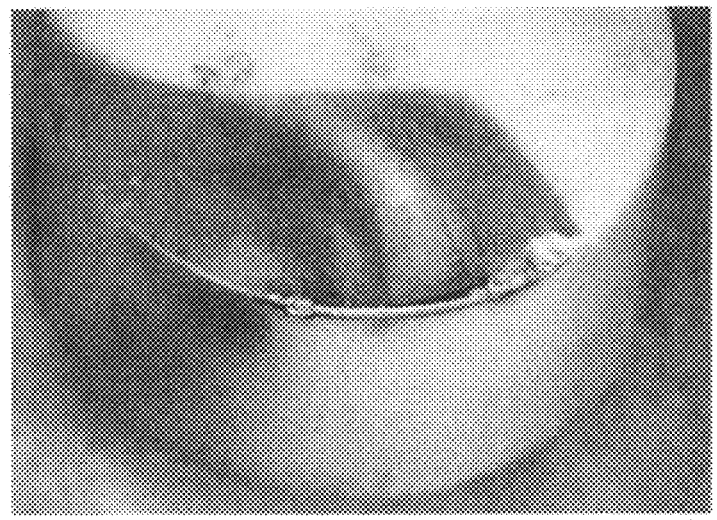
FIG. 5 shows a light optical image of a worn edge of an exemplary ceramic cutting insert according to the invention.
Figure 6:
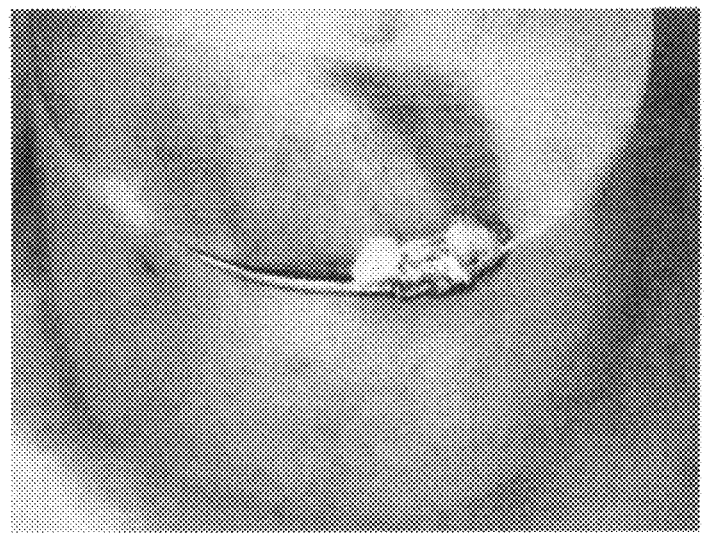
FIG. 6 shows a light optical image of a worn edge of an exemplary ceramic cutting insert according prior art.

Results:

Observation in light optical microscope of the wear pattern showed that the inserts according to the invention, Sample B, (FIG. 5) had as an average, obtained slightly less edge chipping than the references (FIG. 6).

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A method of manufacturing a ceramic cutting insert, based on an oxide ceramic, a nitride ceramic or a mixed ceramic material in a process comprising the powder metallurgical steps of
   providing a ready-to-press ceramic powder,
   pressing the ready-to-press powder into a compact of desired shape,
   sintering the compact to a dense ceramic blank and
   tumbling the ceramic blank to remove sinter skin and provide an edge rounding.

2. A method of claim 1 comprising tumbling said blank until it has an edge rounding with a W value of from about 30 to about 70 μm, an H value of from about 30 to about 70 μm and a W/H ratio of from about 0.8 to about 1.6, and a mean surface roughness value, $MR_a$ value, of equal to or less than about 0.30 μm.

3. A method of claim 1 wherein the compact has a rounded shape.

4. A method of claim 1 wherein the ceramic material is a sialon grade.

5. A method of claim 1 wherein tumbling is conducted for a time being equal to or more than about 300 minutes.

6. A method of claim 1 wherein tumbling is performed in a vibratory tumbler.

7. A method of claim 1 wherein the ceramic material includes whiskers.

8. A method of claim 2 wherein the $MR_a$ value is equal to or less than about 0.25 μm.

9. A method of claim 1 wherein the compact has a rounded shape and the tumbling is conducted for a time being equal to or more than about 300 minutes.

10. A method of claim 1 wherein a tumbling media includes ceramic chips.

11. A method of claim 10 wherein the ceramic chips are aluminum oxide chips.

12. A method of claim 10 wherein a weight ratio of chips: blanks is from about 3:1 to about 7:1 and a total blank weight being from about 5 to about 13 kg.

13. A method of claim 1 further comprising subjecting a tumbled insert to a grinding operation on selected surfaces followed by a second tumbling step to provide a smooth surface and/or an edge rounding.

14. A method of claim 13, wherein selected surfaces are a top surface and a bottom surface of an insert having a rounded shape.

15. A method of claim 1, wherein a surface zone is removed to a depth of about 8 μm to about 10 μm.

16. A method of claim 1, wherein a surface zone is removed to a depth of about 8 μm.

17. A method of claim 1, wherein a surface zone is removed to a depth of about 10 μm.

* * * * *